US009098140B2

(12) United States Patent
Yu et al.

(10) Patent No.: US 9,098,140 B2
(45) Date of Patent: Aug. 4, 2015

(54) POWER-SAVING TOUCH PAD APPARATUS

(71) Applicant: Paragon Technologies Co., Ltd., Gueishan Township, Taoyuan County (TW)

(72) Inventors: Ching-Feng Yu, Gueishan Township, Taoyuan County (TW); Pin-Feng Hung, Gueishan Township, Taoyuan County (TW)

(73) Assignee: PARAGON TECHNOLOGIES CO., LTD., Gueishan Township, Taoyuan County (TW)

( * ) Notice: Subject to any disclaimer, the term of this patent is extended or adjusted under 35 U.S.C. 154(b) by 125 days.

(21) Appl. No.: 13/875,753

(22) Filed: May 2, 2013

(65) Prior Publication Data

US 2014/0327623 A1  Nov. 6, 2014

(51) Int. Cl.
*G06F 3/041* (2006.01)
*G06F 1/32* (2006.01)

(52) U.S. Cl.
CPC ............ *G06F 3/0416* (2013.01); *G06F 1/3231* (2013.01); *G06F 2203/04106* (2013.01); *Y02B 60/1289* (2013.01)

(58) Field of Classification Search
CPC .................. G06F 3/041–3/047; G06F 1/3262; G06F 1/3265; G06F 1/3231; G06F 2203/04106
USPC .................................................. 345/156–184
See application file for complete search history.

(56) References Cited

U.S. PATENT DOCUMENTS

| 2009/0289908 | A1  | 11/2009 | Chen et al. |
| 2010/0110037 | A1  | 5/2010  | Huang et al. |
| 2010/0156790 | A1* | 6/2010  | Su et al. ........................ 345/163 |
| 2011/0109588 | A1* | 5/2011  | Makinen et al. ............... 345/174 |
| 2013/0067816 | A1* | 3/2013  | Chang et al. ...................... 49/25 |
| 2013/0162584 | A1* | 6/2013  | Persson ........................ 345/174 |

FOREIGN PATENT DOCUMENTS

| CN | 1324449 C   | 7/2007 |
| CN | 202257494 U | 5/2012 |

OTHER PUBLICATIONS

Foreign Office action dated Sep. 16, 2014 of Taiwan patent application No. 102109418 (English Translation).*

* cited by examiner

Primary Examiner — Larry Sternbane
(74) Attorney, Agent, or Firm — Muncy, Geissler, Olds & Lowe, P.C.

(57) ABSTRACT

A power-saving touch pad apparatus includes a control unit, a proximity sensing unit, an electric charge induction unit, a touch pad driving-operation unit, and a touch pad unit. The electric charge induction unit is formed by a sputtering process. The electric charge induction unit informs the proximity sensing unit when the electric charge induction unit inducts electric charges. The proximity sensing unit informs the control unit. The control unit is configured to control the touch pad driving-operation unit to wake up the touch pad unit. The electric charge induction unit informs the proximity sensing unit when the electric charge induction unit does not induct electric charges. The proximity sensing unit informs the control unit. The control unit is configured to control the touch pad driving-operation unit to control the touch pad unit to enter a power-saving mode.

10 Claims, 2 Drawing Sheets

POWER-SAVING TOUCH PAD APPARATUS

BACKGROUND OF THE INVENTION

1. Field of the Invention

The present invention relates to a pad apparatus, and especially relates to a power-saving touch pad apparatus.

2. Description of the Related Art

In recent years, the standard of living has improved. Entertainment devices, such as notebooks or televisions, are more and more popular. Especially, notebooks are very popular, so that every household has notebooks.

A user has to use the touch pad of the notebook to control the cursor of the monitor of the notebook if the notebook is not connected to a mouse.

However, the touch pad mentioned above has following disadvantages.

1. The touch pad will not enter the power-saving mode immediately when the user does not use the touch pad. The touch pad will enter the power-saving mode only if the touch pad has not been used for a predetermined time. Therefore, the efficiency of power-saving is not good.

2. The user will feel that the touch pad is delayed if the touch pad is just woken up.

SUMMARY OF THE INVENTION

In order to solve the above-mentioned problems, an object of the present invention is to provide a power-saving touch pad apparatus.

In order to achieve the object of the present invention mentioned above, the power-saving touch pad apparatus includes a control unit, a proximity sensing unit, an electric charge induction unit, a touch pad driving-operation unit, and a touch pad unit. The proximity sensing unit is electrically connected to the control unit. The electric charge induction unit is electrically connected to the proximity sensing unit. The touch pad driving-operation unit is electrically connected to the control unit. The touch pad unit is electrically connected to the touch pad driving-operation unit The electric charge induction unit is formed by a sputtering process. The electric charge induction unit informs the proximity sensing unit when the electric charge induction unit inducts electric charges. The proximity sensing unit informs the control unit. The control unit is configured to control the touch pad driving-operation unit to wake up the touch pad unit. The electric charge induction unit informs the proximity sensing unit when the electric charge induction unit does not induct electric charges. The proximity sensing unit informs the control unit. The control unit is configured to control the touch pad driving-operation unit to control the touch pad unit to enter a power-saving mode.

Moreover, the touch pad unit includes a layout area electrically connected to the touch pad driving-operation unit.

Moreover, the touch pad unit further includes a touch area electrically connected to the layout area. The touch area is touched to generate a touch signal. The touch area sends the touch signal to the touch pad driving-operation unit through the layout area.

Moreover, the touch pad unit further includes a ground area arranged against the layout area and the touch area.

Moreover, the layout area, the touch area, and the ground area are formed by the sputtering process. The electric charge induction unit is around the touch pad unit. The ground area is around the layout area and the touch area.

Moreover, the proximity sensing unit is a capacitive proximity sensor. The touch pad driving-operation unit is a touch pad driving-operation circuit. The control unit is a microcontroller or a microprocessor.

DETAILED DESCRIPTION OF THE INVENTION

Figure 1:
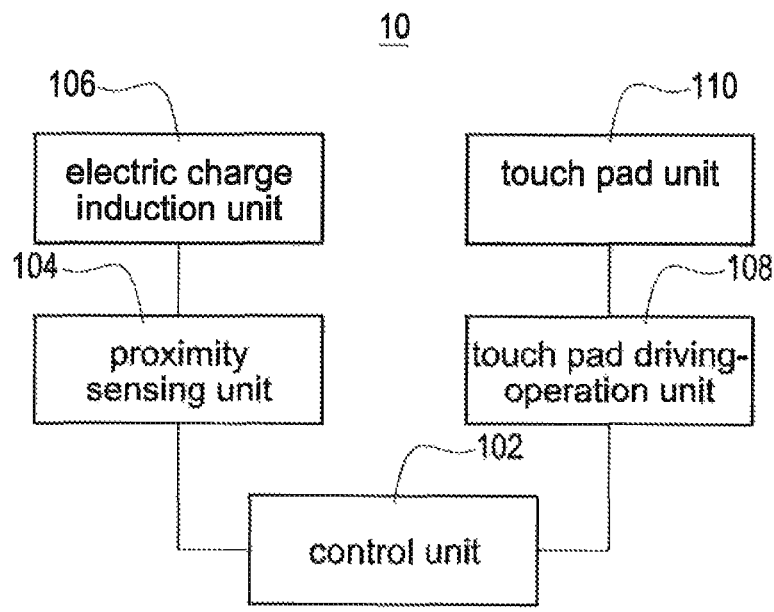
FIG. 1 shows a block diagram of the power-saving touch pad apparatus of the present invention.

FIG. 1 shows a block diagram of the power-saving touch pad apparatus of the present invention. A power-saving touch pad apparatus 10 includes a control unit 102, a proximity sensing unit 104, an electric charge induction unit 106, a touch pad driving-operation unit 108, and a touch pad unit 110.

The proximity sensing unit 104 is electrically connected to the control unit 102. The electric charge induction unit 106 is electrically connected to the proximity sensing unit 104. The touch pad driving-operation unit 108 is electrically connected to the control unit 102. The touch pad unit 110 is electrically connected to the touch pad driving-operation unit 108.

The electric charge induction unit 106 is formed by a sputtering process (for example, sputtering on the case of the power-saving touch pad apparatus 10, or sputtering around the touch pad unit 110).

The electric charge induction unit 106 informs the proximity sensing unit 104 when the electric charge induction unit 106 inducts electric charges (for example, the user's hand is approaching). The proximity sensing unit 104 informs the control unit 102. The control unit 102 is configured to control the touch pad driving-operation unit 108 to wake up the touch pad unit 110.

The electric charge induction unit 106 informs the proximity sensing unit 104 when the electric charge induction unit 106 does not induct electric charges (for example, the user's hand is leaving). The proximity sensing unit 104 informs the control unit 102. The control unit 102 is configured to control the touch pad driving-operation unit 108 to control the touch pad unit 110 to enter a power-saving mode.

The proximity sensing unit 104 is, for example, a capacitive proximity sensor. The touch pad driving-operation unit 108 is, for example, a touch pad driving-operation circuit. The control unit 102 is, for example, a microcontroller or a microprocessor.

Figure 2:
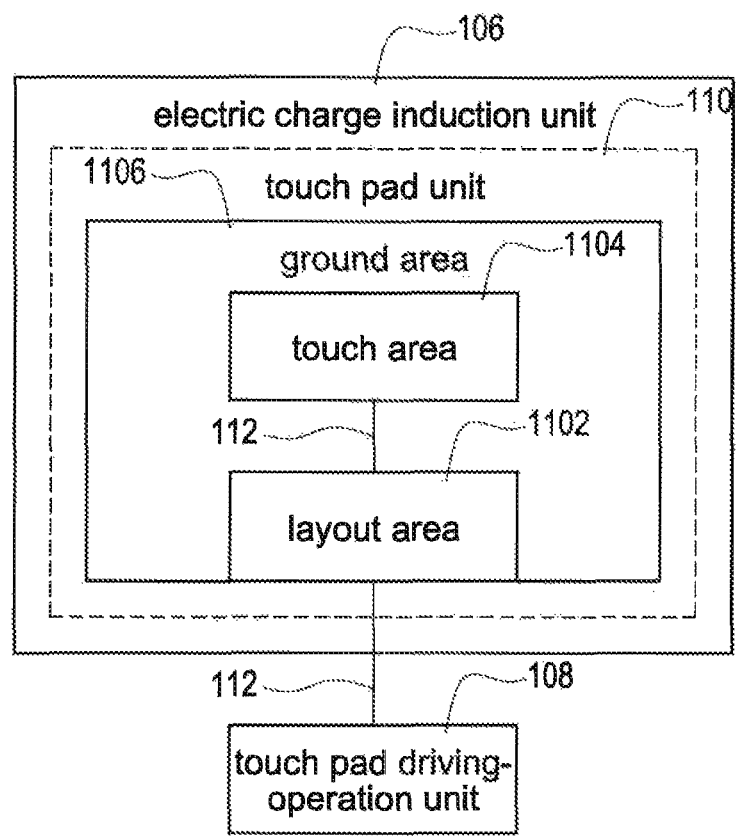
FIG. 2 shows a block diagram of the touch pad unit of the present invention.
Figure 3:
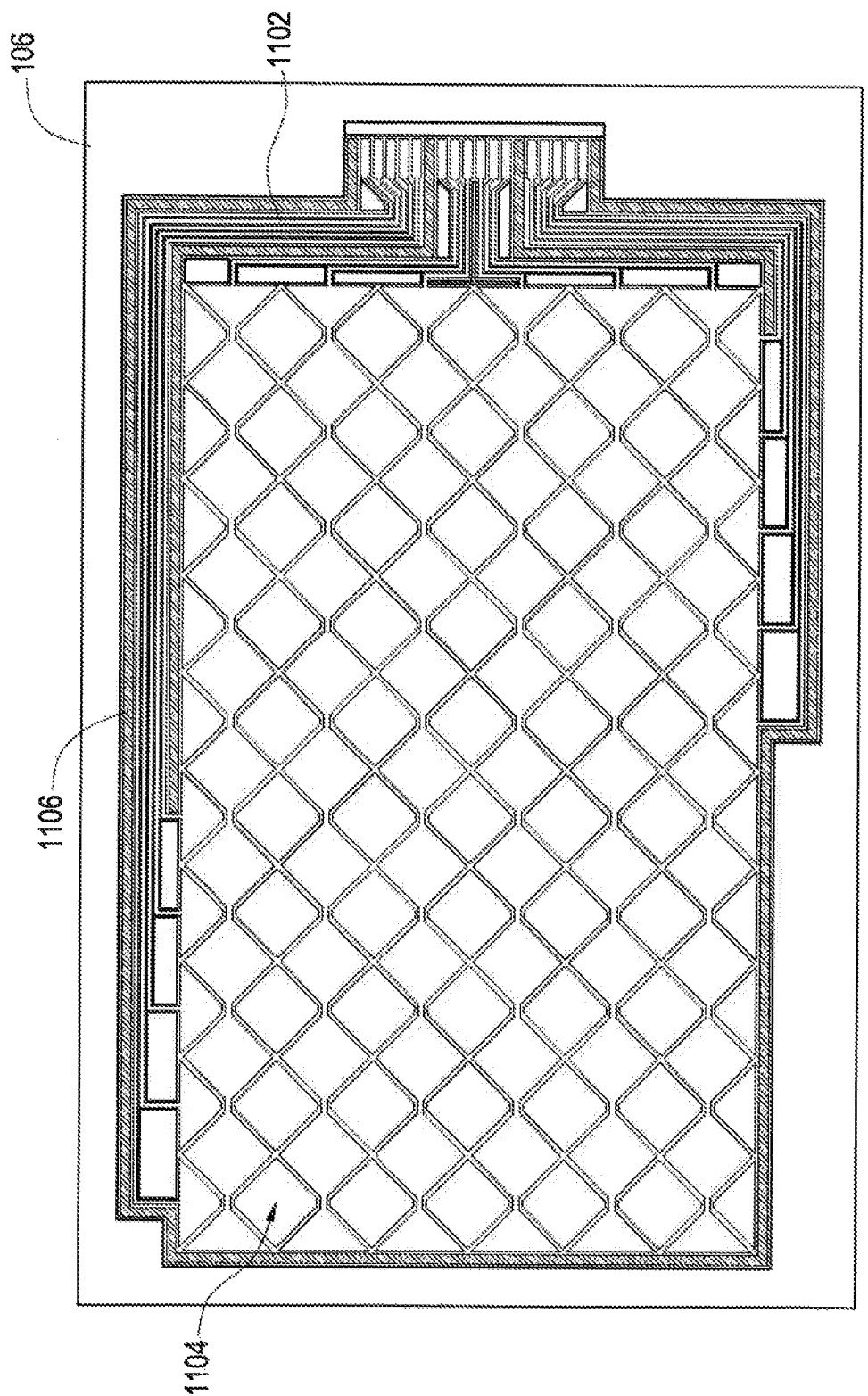
FIG. 3 shows a diagram of an embodiment of the touch pad unit of the present invention.

FIG. 2 shows a block diagram of the touch pad unit of the present invention. FIG. 3 shows a diagram of an embodiment of the touch pad unit of the present invention. The touch pad unit 110 includes a layout area 1102, a touch area 1104, and a ground area 1106.

The layout area 1102 is electrically connected to the touch pad driving-operation unit 108. The touch area 1104 is electrically connected to the layout area 1102. The ground area 1106 is arranged against the layout area 1102 and the touch area 1104.

The touch area 1104 is touched by the user to generate a touch signal 112. The touch area 1104 sends the touch signal 112 to the touch pad driving-operation unit 108 through the layout area 1102.

The touch pad driving-operation unit 108 is used to drive the touch pad unit 110 and process the touch signal 112 to calculate and derive the user's touch position on the touch area 1104.

The ground area 1106 is used to protect the stability of the touch area 1104 and the layout area 1102. The layout area 1102, the touch area 1104, and the ground area 1106 are formed by the sputtering process.

The electric charge induction unit 106 is around the touch pad unit 110. The ground area 1106 is around the layout area 1102 and the touch area 1104.

In an embodiment, one part of the ground area 1106 is removed (or covered) to formed the electric charge induction unit 106 by the sputtering process. The embodiment mentioned above will reduce the manufacturing hours and costs, and will not require any extra parts (no physical electric charge induction plate is required).

The present invention has following features.

1. The touch pad unit 110 will enter the power-saving mode immediately when the user's hand is away from the electric charge induction unit 106. Therefore, the efficiency of power-saving is good.

2. The touch pad unit 110 is woken up immediately when the user's hand is approaching the electric charge induction unit 106 (the user wants to use the touch pad unit 110 to control, for example, the cursor of the monitor of the notebook). Therefore, the user will not feel that the touch pad unit 110 is delayed when the user uses the touch pad unit 110 (because the touch pad unit 110 has been woken up before the user touches the touch pad unit 110).

3. The structure is simple. No physical electric charge induction plate is required. The electric charge induction unit 106 is formed by the sputtering process.

The distances that the electric charge induction unit 106 inducts that the user's hand (or body) is leaving or approaching mentioned above could be designed according to requirement. The present invention is not limited to the contents mention above.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power-saving touch pad apparatus including:
   a control unit;
   a proximity sensing unit electrically connected to the control unit;
   an electric charge induction unit comprising a case of the power-saving touch pad apparatus and electrically connected to the proximity sensing unit, wherein the electric charge induction unit is formed by a sputtering process sputtering on the case of the power-saving touch pad apparatus;
   a touch pad driving-operation unit electrically connected to the control unit; and
   a touch pad unit electrically connected to the touch pad driving-operation unit,
   wherein the electric charge induction unit informs the proximity sensing unit and the proximity sensing unit informs the control unit when the electric charge induction unit inducts electric charges; the control unit is configured to control the touch pad driving-operation unit to wake up the touch pad unit;
   wherein the electric charge induction unit informs the proximity sensing unit and the proximity sensing unit informs the control unit when the electric charge induction unit does not induct electric charges; the control unit is configured to control the touch pad driving-operation unit to control the touch pad unit to enter a power-saving mode.

2. The power-saving touch pad apparatus in claim 1, wherein the touch pad unit includes a layout area electrically connected to the touch pad driving-operation unit.

3. The power-saving touch pad apparatus in claim 2, wherein the touch pad unit further includes a touch area electrically connected to the layout area; the touch area is touched to generate a touch signal; the touch area sends the touch signal to the touch pad driving-operation unit through the layout area.

4. The power-saving touch pad apparatus in claim 3, wherein the touch pad unit further includes a ground area arranged against the layout area and the touch area.

5. The power-saving touch pad apparatus in claim 4, wherein the layout area, the touch area, and the ground area are formed by the sputtering process.

6. The power-saving touch pad apparatus in claim 5, wherein the electric charge induction unit is around the touch pad unit.

7. The power-saving touch pad apparatus in claim 6, wherein the ground area is around the layout area and the touch area.

8. The power-saving touch pad apparatus in claim 7, wherein the proximity sensing unit is a capacitive proximity sensor.

9. The power-saving touch pad apparatus in claim 8, wherein the touch pad driving-operation unit is a touch pad driving-operation circuit.

10. The power-saving touch pad apparatus in claim 9, wherein the control unit is a microcontroller or a microprocessor.

\* \* \* \* \*